United States Patent
Palmer et al.

(10) Patent No.: US 7,499,175 B1
(45) Date of Patent: Mar. 3, 2009

(54) ENHANCED MICHELSON INTERFEROMETRIC OPTICAL FILTER WITH BROADENED WAVELENGTH BLOCKAGE

(75) Inventors: Alice L. Palmer, Sunnyvale, CA (US); Robert D. Sigler, Cupertino, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 286 days.

(21) Appl. No.: 11/505,818

(22) Filed: Aug. 18, 2006

Related U.S. Application Data

(60) Provisional application No. 60/801,048, filed on May 18, 2006.

(51) Int. Cl.
*G01B 9/02* (2006.01)
(52) U.S. Cl. .................................................. 356/450
(58) Field of Classification Search ................. 356/450, 356/496
See application file for complete search history.

(56) References Cited

U.S. PATENT DOCUMENTS

| | | | |
|---|---|---|---|
| 6,816,315 B1 * | 11/2004 | Ai et al. | 359/637 |
| 2002/0154314 A1 * | 10/2002 | Copner et al. | 356/450 |

\* cited by examiner

*Primary Examiner*—Alessandro Amari
(74) *Attorney, Agent, or Firm*—McDermott Will & Emery LLP

(57) ABSTRACT

An interferometer for nulling a broad range of wavelengths is provided. The interferometer includes a beamsplitter, a first mirror and a second mirror. Incoming radiation is split by the beamsplitter into a first sub-signal and a second sub-signal, which are reflected by the first mirror and the second mirror, respectively, back to the beamsplitter, where they are combined to form an output signal. The interferometer further includes a first plate disposed between the beamsplitter and the first mirror and a second plate disposed between the beamsplitter and the second mirror. The first plate and the second plate have the same refractive index and thickness. The first plate is disposed perpendicular to the direction of the first sub-signal, and the second plate is disposed at an angle $\theta$ to the direction of the second sub-signal. The beam dispersion caused by the tilt of the second plate attenuates the amplitude of a broad range of wavelengths in the output signal.

24 Claims, 7 Drawing Sheets

ENHANCED MICHELSON INTERFEROMETRIC OPTICAL FILTER WITH BROADENED WAVELENGTH BLOCKAGE

CROSS-REFERENCE TO RELATED APPLICATION

The present application claims the benefit of priority under 35 U.S.C. § 119 from U.S. Provisional Patent Application Ser. No. 60/801,048 entitled "ENHANCED MICHELSON INTERFEROMETRIC OPTICAL FILTER WITH BROADENED WAVELENGTH BLOCKAGE," filed on May 18, 2006, the disclosure of which is hereby incorporated by reference in its entirety for all purposes.

STATEMENT REGARDING FEDERALLY SPONSORED RESEARCH OR DEVELOPMENT

Not Applicable.

FIELD OF THE INVENTION

The present invention generally relates to interferometry and, more particularly, relates to interferometers with broadened wavelength blockage.

BACKGROUND OF THE INVENTION

Michelson interferometers are commonly used as optical filters or "nullers," which destructively interfere a particular wavelength of radiation and thereby strongly attenuate its amplitude. This is accomplished by translating a moveable mirror in one of the two legs of the Michelson interferometer to introduce a optical path length difference between the two beams. The resulting null, however, covers a very narrow range of wavelengths, centered around a wavelength where the path difference is an odd integer multiple of 0.5 wavelengths.

Accordingly, there is a need to provide an interferometer which can null a broader range of wavelengths than is possible with a conventional Michelson interferometer. The present invention satisfies this needs and provides other advantages as well.

SUMMARY OF THE INVENTION

In accordance with the present invention, an interferometer for nulling a broad range of wavelengths is provided. The interferometer includes a beamsplitter, a first mirror and a second mirror. Incoming radiation is split by the beamsplitter into a first sub-signal and a second sub-signal, which are reflected by the first mirror and the second mirror, respectively, back to the beamsplitter, where they are combined to form an output signal. The interferometer further includes a first plate disposed between the beamsplitter and the first mirror and a second plate disposed between the beamsplitter and the second mirror. The first plate and the second plate have the same refractive index and thickness. The first plate is disposed perpendicular to the direction of the first sub-signal, and the second plate is disposed at an angle $\theta$ to the direction of the second sub-signal. The beam dispersion caused by the tilt of the second plate attenuates the amplitude of a broad range of wavelengths in the output signal.

According to one embodiment, the present invention is an interferometer with wavelength blockage based on a predetermined wavelength. The interferometer includes a beamsplitter that splits an incoming signal into a first sub-signal and a second sub-signal. The interferometer further includes a first plate through which the first sub-signal passes. The first plate has a refractive index n and a thickness t, and is disposed perpendicular to a direction in which the first sub-signal travels. The interferometer further includes a first mirror that receives the first sub-signal from the first plate and directs the first sub-signal back through the first plate to the beamsplitter. The interferometer further includes a second plate through which the second sub-signal passes. The second plate has a refractive index n and a thickness t, and is disposed at an angle $\theta$ to a direction in which the second sub-signal travels. The interferometer further includes a second mirror that receives the second sub-signal from the second plate and that directs the second sub-signal back through the second plate to the beamsplitter where the first sub-signal and the second sub-signal are combined to form an output signal. The output signal has a range of wavelengths with attenuated amplitudes. One of the first mirror and the second mirror is a moveable mirror that adjusts an optical path length of a respective one of the first sub-signal and the second sub-signal to introduce an optical path difference ("OPD") between the optical path lengths of the first sub-signal and the second sub-signal.

According to another embodiment, the present invention is an interferometer with wavelength blockage based on a predetermined wavelength. The interferometer includes a beamsplitter that splits an incoming signal into a first sub-signal and a second sub-signal. The interferometer further includes a first plate through which the first sub-signal passes. The first plate has a refractive index n and a thickness t, is substantially transparent at the predetermined wavelength, and is disposed perpendicular to a direction in which the first sub-signal travels. The interferometer further includes a first mirror that receives the first sub-signal from the first plate and directs the first sub-signal back through the first plate to the beamsplitter. The interferometer further includes a second plate through which the second sub-signal passes. The second plate has a refractive index n and a thickness t, is substantially transparent at the predetermined wavelength, and is disposed at an angle $\theta$ to a direction in which the second sub-signal travels. The interferometer further includes a second mirror that receives the second sub-signal from the second plate and that directs the second sub-signal back through the second plate to the beamsplitter where the first sub-signal and the second sub-signal are combined to form an output signal. The output signal has a range of wavelengths with attenuated amplitudes. The interferometer further includes a first compensator plate through which the first sub-signal passes. The first compensator plate is disposed between the beamsplitter and the first mirror, is substantially transparent at the predetermined wavelength, has a refractive index n and a thickness ½t, and is disposed at an angle $\theta$ to the direction in which the first sub-signal travels. The interferometer further includes a second compensator plate through which the second sub-signal passes. The second compensator plate is disposed between the beamsplitter and the second mirror, is substantially transparent at the predetermined wavelength, has a refractive index n and a thickness ½t, and is disposed perpendicular to the direction in which the second sub-signal travels. One of the first mirror and the second mirror is a moveable mirror that adjusts an optical path length of a respective one of the first sub-signal and the second sub-signal to introduce an optical path difference ("OPD") between the optical path lengths of the first sub-signal and the second sub-signal.

According to another embodiment, the present invention is a method for nulling a broad range of wavelengths using an interferometer. The method includes the steps of splitting an incoming signal into a first sub-signal and a second sub-signal using a beamsplitter and passing the first sub-signal through a first plate having a refractive index n and a thickness t. The first plate is disposed perpendicular to a direction in which the first sub-signal travels. The method further includes the step of receiving the first sub-signal from the first plate with a first mirror and directing the first sub-signal back through the first plate to the beamsplitter. The method further includes the step of passing the second sub-signal through a second plate having a refractive index n and a thickness t. The second plate is disposed at an angle θ to a direction in which the second sub-signal travels. The method further includes the step of receiving the second sub-signal from the second plate with a second mirror that directs the second sub-signal back through the second plate to the beamsplitter. The method further includes the step of combining the first sub-signal and the second sub-signal with the beamsplitter to form an output signal having a range of wavelengths with attenuated amplitudes. One of the first mirror and the second mirror is a moveable mirror that adjusts an optical path length of a respective one of the first sub-signal and the second sub-signal to introduce an optical path difference ("OPD") between the optical path lengths of the first sub-signal and the second sub-signal.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1A:
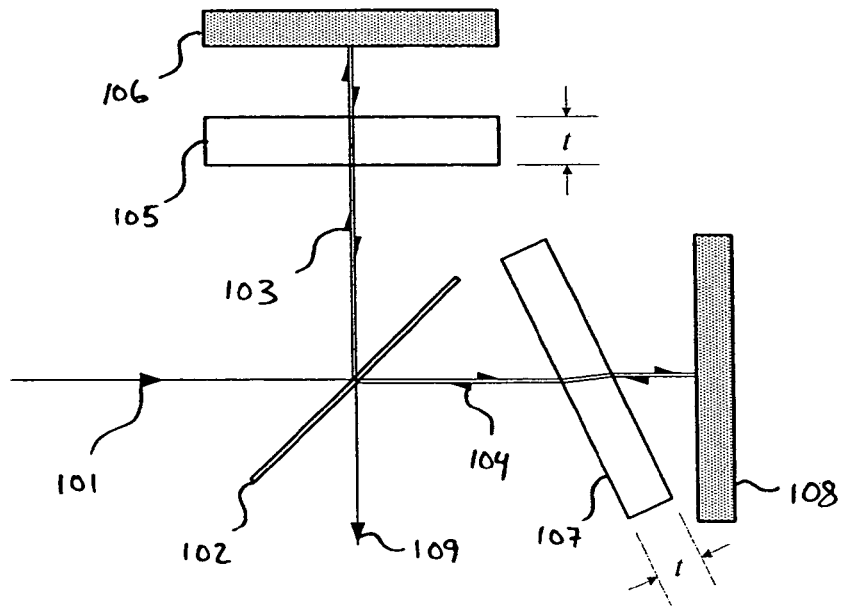
FIG. 1A depicts an interferometer according to one embodiment of the present invention.

FIG. 1A illustrates an interferometer 100 with broadened wavelength blockage according to one embodiment of the present invention. An incoming signal 101 is split by a beamsplitter 102 into a first sub-signal 103 and a second sub-signal 104. First sub-signal 103 passes through a first plate 105 to a first mirror 106, which reflects first sub-signal 103 back through first plate 105 to beamsplitter 102. Meanwhile, second sub-signal 104 passes through a second plate 107 to a second mirror 108, which reflects second sub-signal 104 back through second plate 107 to beamsplitter 102. Beamsplitter 102 combines first sub-signal 103 and second sub-signal 104 to form an output signal 109.

Both first plate 105 and second plate 107 have the same thickness t and the same refractive index n, and are substantially transparent at a predetermined wavelength about which a range of wavelengths is nulled. First plate 105 is disposed perpendicular to the direction in which first sub-signal 103 travels. Second plate 107 is inclined or tilted at an angle θ to the direction in which second sub-signal 104 travels.

According to one embodiment, beamsplitter 102 is a half-silvered mirror. According to other embodiments, beamsplitter 102 may be a plate with a dielectric optical coating, a thin pellicle film, or any one of a number of other beamsplitters known to those of skill in the art. According to one embodiment, first plate 105 and second plate 107 are composed of silica. According to an alternate embodiment, first plate 105 and second plate 107 are composed of an infrared-(IR) transparent material, such as potassium bromide (KBr). While the present exemplary embodiments have been described with reference to specific materials and arrangements, it will be apparent to those of skill in the art that the scope of the present invention is not limited thereby, but rather includes interferometers having plates manufactured of any material which is substantially transparent at a desired wavelength.

Figure 1B:
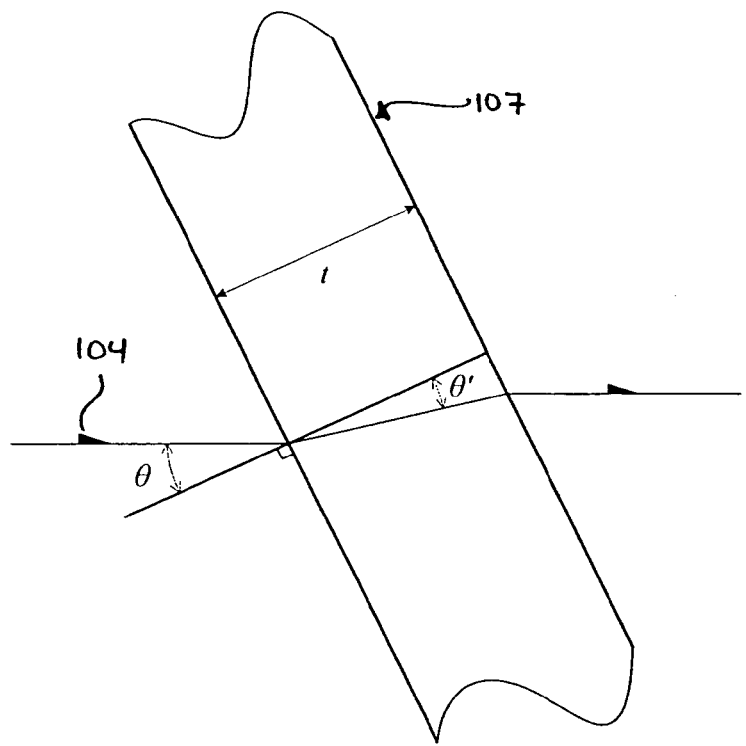
FIG. 1B depicts the tilt angle of the second plate shown in FIG. 1A.

Second mirror 108 is a moveable mirror which can be translated or "pistoned" back and forth in the direction in which second sub-signal 104 travels to adjust the optical path length of second sub-signal 104. FIG. 1B, which shows a close-up view of second plate 107, illustrates how the angle θ at which second plate 107 is tilted with respect to the direction in which second sub-signal 104 travels affects the angle θ' by which second sub-signal 104 is refracted in second plate 107 in accordance with Snell's law. This refraction of second sub-signal 104 further adjusts the optical path length traveled by second sub-signal 104, as is discussed more fully below. Both the optical path difference between the sub-signals and the beam dispersion caused by the inclination of second plate 107 cause destructive interference in output signal 109 over a range of wavelengths about a predetermined wavelength, as is discussed more fully below.

Equation 1, below, expresses Snell's law, which is used to calculate the refraction of light when traveling between two media of differing refractive index (for the present description, it is assumed that the refractive index outside of the second plate 107 is 1.0):

$$\sin\theta = n\sin\theta'. \qquad [1]$$

Written another way, Equation 1 becomes $$\sin\theta' = \frac{\sin\theta}{n}, \quad [2]$$

which can be solved for $\cos\theta'$:

$$\cos\theta' = \sqrt{1 - \left(\frac{\sin\theta}{n}\right)^2} = \frac{\sqrt{n^2 - \sin^2\theta}}{n}. \quad [3]$$

The optical path difference ("OPD") experienced by second sub-signal 104 as it passes through second plate 107 is given by Equation 4:

$$OPD_g = tn\left(\frac{1}{\cos\theta'} - 1\right) \quad [4]$$

which, by substituting the value of $\cos\theta'$ determined in Equation 3, provides:

$$OPD_g = t\left(\frac{n^2}{\sqrt{n^2 - \sin^2 n}} - n\right). \quad [5]$$

Meanwhile, the difference in the optical path experienced by second sub-signal 104 as it passes through the air or vacuum outside of second plate 107 is given by Equation 6:

$$OPD_a = t\left(1 - \frac{\cos(\theta - \theta')}{\cos\theta'}\right), \quad [6]$$

which, by substituting the value of $\cos\theta'$ determined in Equation 3, can be reduced to:

$$OPD_a = t\left(1 - \cos\theta - \frac{\sin^2\theta}{\sqrt{n^2 - \sin^2\theta}}\right). \quad [7]$$

Accordingly, the total difference in the optical path length experienced by second sub-signal 104 as a result of the angle $\theta$ at which second plate 107 is tilted can be calculated by adding Equation 7 and Equation 5. To express this optical path difference in terms of wavelength, a $1/\lambda$ term is included:

$$OPD_{a+g} = \frac{t}{\lambda}\left(1 - n - \cos\theta + \sqrt{n^2 - \sin^2\theta}\right). \quad [8]$$

To account for the optical path difference caused by the translation of second mirror 108, a piston term (p) is included. A factor of 2 is also included to account for the double pass of second sub-signal 104 after it reflects off of second mirror 108. This provides the total optical path difference caused by the translation of second mirror 108 by piston amount p and the inclination of second plate 107 by angle $\theta$:

$$OPD = \frac{2t}{\lambda}\left(\frac{p}{t} + 1 - n - \cos\theta + \sqrt{n^2 - \sin^2\theta}\right). \quad [9]$$

By calculating the differential of the OPD determined in Equation 9 with respect to wavelength and setting the differential thereof equal to zero, the distance p by which second mirror 108 must be translated for given values of $\theta$, $\lambda$ and t can be determined:

$$p = t\left[n - 1 + \cos\theta - \sqrt{n^2 - \sin^2\theta} + \lambda\frac{dn}{d\lambda}\left(\frac{n}{\sqrt{n^2 - \sin^2\theta}} - 1\right)\right]. \quad [10]$$

Setting the value for p so that the OPD stationary point is at a predetermined wavelength $\lambda_0$ and substituting that value into Equation 9 provides:

$$OPD = 2t\frac{dn}{d\lambda}\bigg|_{\lambda=\lambda_0}\left(\frac{n_0}{\sqrt{n_0 - \sin^2\theta}} - 1\right), \quad [11]$$

where $n_0$ is the refractive index of second plate 107 at predetermined wavelength $\lambda_0$.

For a desired OPD (e.g., an odd integer multiple of one half of $\lambda_0$ to provide a null or range of wavelengths with attenuated amplitude about $\lambda_0$), Equation 11 can be solved to yield the angle $\theta$ at which second plate 107 should be inclined:

$$\sin\theta = n_0\sqrt{1 - \frac{1}{\left(\frac{OPD}{2t\frac{dn}{d\lambda}\big|_{\lambda=\lambda_0}} + 1\right)^2}}. \quad [12]$$

Equation 12 only has a real solution if the squared quantity is greater than or equal to 1 or, equivalently, if OPD and the differential of n with respect to $\lambda$ where $\lambda=\lambda_0$ have the same sign.

The breadth of the range of wavelengths attenuated by interferometer 100 may be adjusted by varying the optical path difference used in Equation 12. By selecting a higher odd integer multiple of one half of the predetermined wavelength $\lambda_0$ (e.g., $3/2 \times \lambda_0$ instead of $1/2 \times \lambda_0$), the resultant null can be selectively narrowed, as described in greater detail below with reference to FIGS. 8 through 10.

While in the present exemplary embodiment, second mirror 108 has been described as a moveable mirror, the scope of the present invention is not limited to such an arrangement. In alternate embodiments, first mirror 106 may be a moveable mirror and second mirror 108 may be a fixed mirror, or both first mirror 106 and second mirror 108 may be moveable mirrors. As will be apparent to those of skill in the art, if first mirror 106 is translated while second plate 107 is tilted, a simple sign change in Equation 9 will account for the change in the OPD.

While in the present exemplary embodiment, the refractive index experienced by second sub-signal 104 outside of second plate 107 has been assumed to be 1.0, the scope of the present invention is not limited to such an arrangement. As will be apparent to those of skill in the art, the present invention has application to any of a number of interferometer arrangements in which the sub-signals travel through materials having refractive indices higher than one.

In interferometer 100, because second plate 107 is tilted with respect to the direction in which second sub-signal 104 travels, beam dispersion is introduced in second sub-signal 104. Because first plate 105 is disposed perpendicular to the direction in which first sub-signal 103 travels, however, first sub-signal 103 is not refracted, and therefore no beam dispersion is introduced in first sub-signal 103. This arrangement, in which beam dispersion is introduced in only one "leg" of the interferometer (i.e., the "leg" in which second plate 107 is disposed), introduces Fresnel reflection losses, which change the amplitude of second sub-signal 104 with respect to first sub-signal 103. Accordingly, the interference experienced by the nulled wavelengths is not as destructive as may be desired for some applications. To more destructively interfere the first and second sub-signals, the interferometer illustrated in FIG. 2 introduces beam dispersion in both legs of the interferometer.

Figure 2:
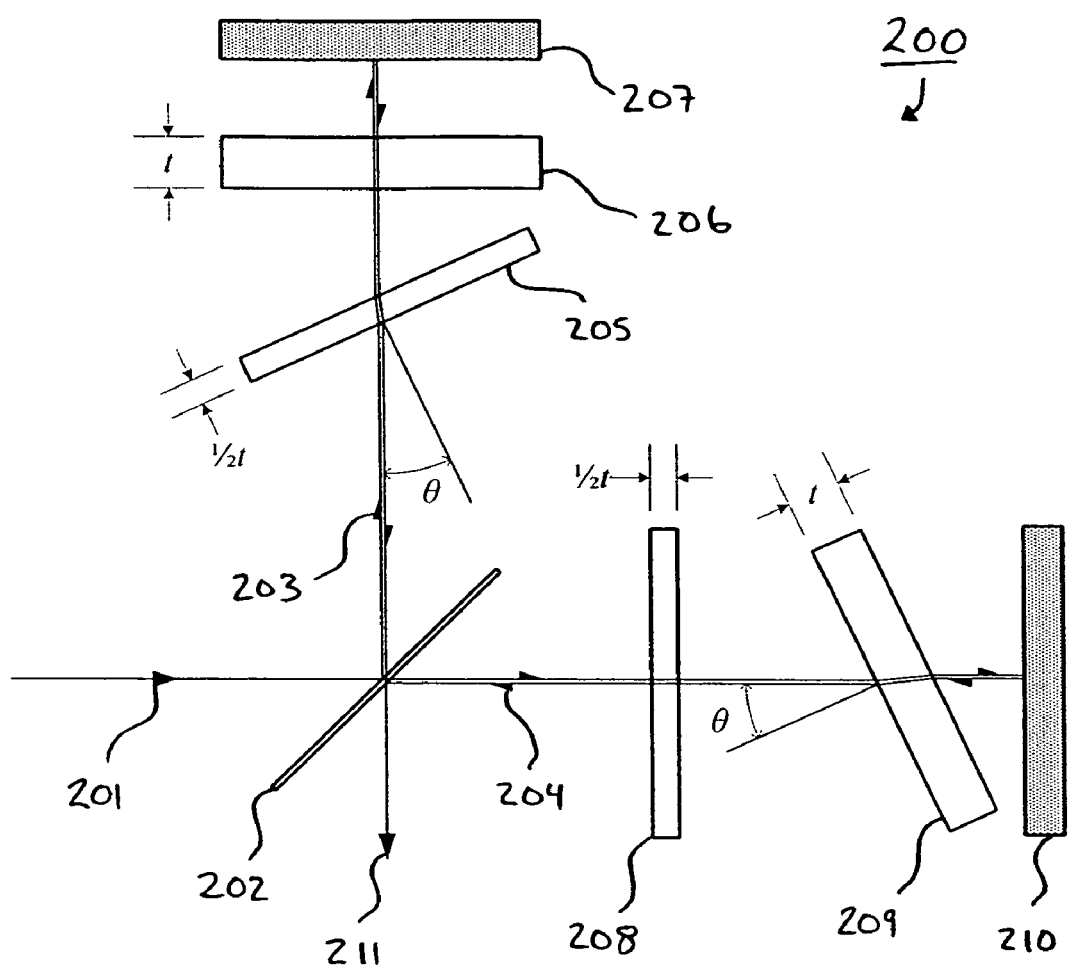
FIG. 2 depicts an interferometer according to another embodiment of the present invention.

FIG. 2 illustrates an interferometer 200 with broadened wavelength blockage according to another embodiment of the present invention. An incoming signal 201 is split by a beamsplitter 202 into a first sub-signal 203 and a second sub-signal 204. First sub-signal 203 passes through a first compensator plate 205 and a first plate 206 to a first mirror 207, which reflects first sub-signal 203 back through first plate 206 and first compensator plate 205 to beamsplitter 202. Meanwhile, second sub-signal 204 passes through a second compensator plate 208 and a second plate 209 to a second mirror 210, which reflects second sub-signal 204 back through second plate 209 and second compensator plate 208 to beamsplitter 202, where first sub-signal 203 and second sub-signal 204 are combined to form an output signal 211. Both first plate 206 and second plate 209 have the same thickness t, and both first compensator plate 205 and second compensator plate 208 have the same thickness ½t. All of first plate 206, second plate 209, first compensator plate 205 and second compensator plate 208 have the same refractive index n, and are substantially transparent at a predetermined wavelength about which a range of wavelengths is nulled.

In much the same fashion as in interferometer 100 of FIGS. 1A and 1B, second mirror 210 is a moveable mirror which can be translated or "pistoned" back and forth in the direction in which second sub-signal 204 travels to adjust the optical path length of second sub-signal 204. Second plate 209 is inclined or tilted at an angle θ to the direction in which second sub-signal 204 travels, and first compensator plate 205 is inclined or tilted at an angle θ to the direction in which first sub-signal 203 travels. The angle θ at which second plate 209 and first compensator plate 205 are tilted affects the optical path length traveled by first sub-signal 203 and second sub-signal 204 according to Snell's law, as is discussed more fully above. By tilting first compensator plate 205 at an angle θ to the direction in which first sub-signal 203 travels, beam dispersion is introduced into first sub-signal 203 in much the same way as the inclination of second plate 209 introduces beam dispersion into second sub-signal 204. The presence of beam dispersion in both first and second sub-signals 203 and 204 allows a more total destructive interference of first and second sub-signals 203 and 204 for a predetermined wavelength when they are combined into output signal 211, as illustrated more fully below with respect to FIGS. 5 through 10.

While in the present exemplary embodiment shown in FIG. 2, the first and second sub-signals 203 and 204 are described as passing through the first and second compensator plates 205 and 208 prior to passing through the first and second plates 206 and 209, the scope of the present invention is not limited to such an arrangement. In an alternate embodiment, for example, the components of the interferometer can be arranged such that the first and second sub-signals may pass through the first and second compensator plates after having passed through the first and second plates. Alternatively, in one leg of the interferometer, a sub-signal may pass through a plate before passing through a compensator plate, while in the other leg, the other sub-signal may pass through the compensator plate first. As will be apparent to those of skill in the art, the present invention has application to interferometers in which the plates and compensator plates are arranged in any order.

While in both of the present exemplary embodiments, the legs of the interferometers of the present invention have been illustrated as being disposed at right angles, the scope of the present invention is not limited to such an arrangement. As will be apparent to those of skill in the art, a beamsplitter need not necessarily split an incoming signal into two signals at right angles to one another. Accordingly, the scope of the present invention includes arrangements in which the legs of an interferometer are disposed at any angle relative to one another.

Figure 3:
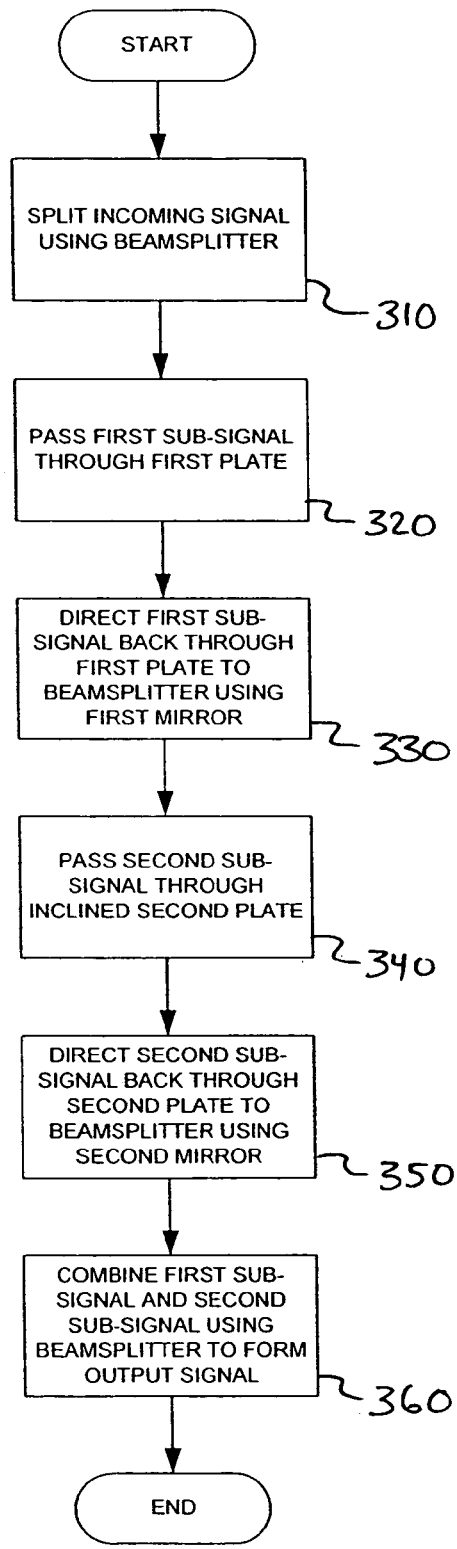
FIG. 3 is a flowchart illustrating a method for nulling a broad range of wavelengths using an interferometer according to another embodiment of the present invention.

Turning to FIG. 3, a method for nulling a broad range of wavelengths using an interferometer according to one embodiment of the present invention is illustrated. In step 310, an incoming signal is split into a first sub-signal and a second sub-signal using a beamsplitter. In step 320, the first sub-signal is passed through a first plate with a refractive index n and a thickness t. The first plate is disposed perpendicular to the direction in which first sub-signal travels. In step 330, the first sub-signal is received by a first mirror, which directs the first sub-signal back through the first plate to the beamsplitter.

In step 340, meanwhile, the second sub-signal is passed through a second plate with a refractive index n and a thickness t. The second plate is inclined at an angle θ to the direction in which the second sub-signal travels, to introduce an optical path difference between the optical path lengths of the first sub-signal and the second sub-signal and to introduce beam diffraction into the second sub-signal, as is discussed more fully above. In step 350, the second sub-signal is received by a moveable second mirror, which directs the second sub-signal back through the inclined second plate to the beamsplitter. The moveable mirror is translated or pistoned by a distance p to introduce an optical path difference between the optical path lengths of the first sub-signal and the second sub-signal, as is discussed more fully above.

In step 360, the first sub-signal and the second sub-signal are combined into an output signal by the beamsplitter. As a result of the beam dispersion in the second sub-signal and the optical path difference between the first and second sub-signals being an odd integer multiple of half of a predetermined wavelength, the output signal has a broad range of wavelengths with attenuated amplitudes, as is illustrated more fully below with respect to FIGS. 5 through 10.

Figure 4:
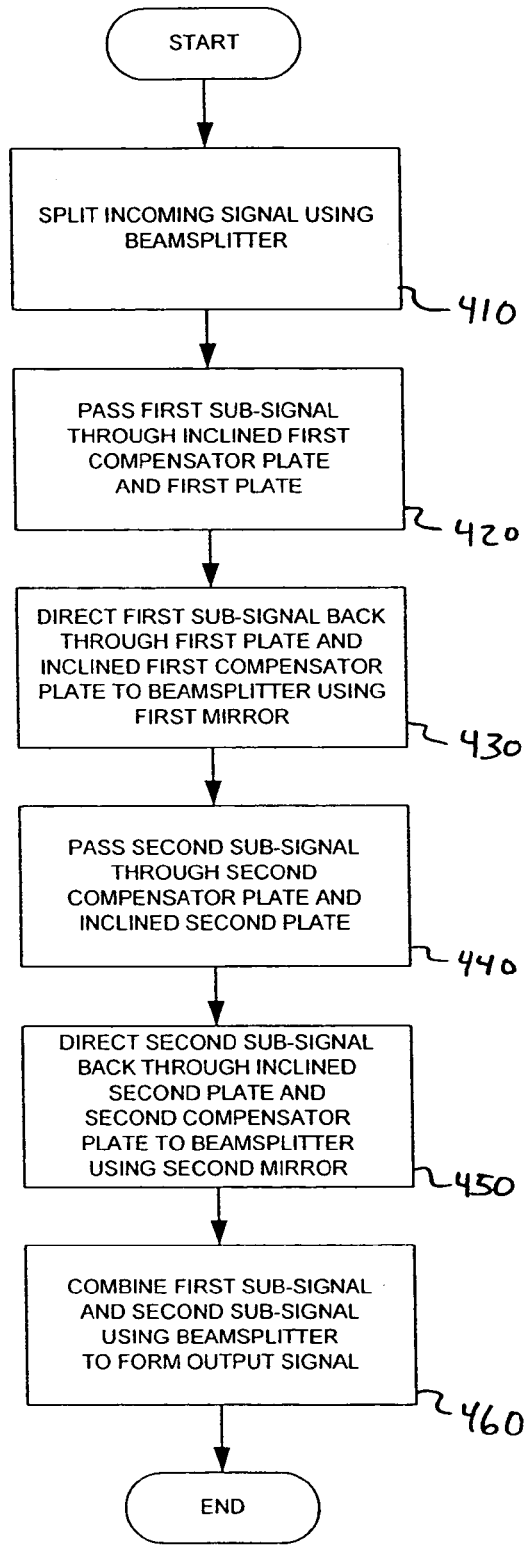
FIG. 4 is a flowchart illustrating a method for nulling a broad range of wavelengths using an interferometer according to another embodiment of the present invention.

FIG. 4 illustrates a method for nulling a broad range of wavelengths using an interferometer according to another embodiment of the present invention. In step 410, an incoming signal is split into a first sub-signal and a second sub-signal using a beamsplitter. In step 420, the first sub-signal is passed through a first compensator plate with a refractive index n and a thickness ½t and through a first plate with a refractive index n and a thickness t. The first compensator plate is disposed at an angle θ to the direction in which the first sub-signal travels, while the first plate is disposed perpendicular to the direction in which first sub-signal travels. In step 430, the first sub-signal is received by a first mirror, which directs the first sub-signal back through the first plate and the first compensator plate to the beamsplitter.

In step 440, meanwhile, the second sub-signal is passed through a second compensator plate with a refractive index n and a thickness ½t and through a second plate with a refractive index n and a thickness t. The second compensator plate is disposed perpendicular to the direction in which first sub-signal travels. The second plate is disposed at an angle θ to the direction in which the second sub-signal travels, to introduce an optical path difference between the optical path length of the second sub-signal and the second sub-signal and to introduce beam diffraction into the second sub-signal, as is discussed more fully above. In step 450, the second sub-signal is received by a moveable second mirror, which directs the second sub-signal back through the second plate and the second compensator plate to the beamsplitter. The moveable mirror is translated or pistoned by a distance p to introduce an optical path difference between the optical path length of the first sub-signal and the second sub-signal, as is discussed more fully above.

In step 460, the first sub-signal and the second sub-signal are combined into an output signal by the beamsplitter. As a result of the beam dispersion in the second sub-signal and the optical path difference between the first and second sub-signals being an odd integer multiple of half of a predetermined wavelength, the output signal has a broad range of wavelengths with attenuated amplitudes. By tilting the first compensator plate at an angle θ to the direction in which the first sub-signal travels, beam dispersion is introduced into the first sub-signal in much the same way as the inclination of the second plate introduces beam dispersion into the second sub-signal. The presence of beam dispersion in both the first and second sub-signals allows a more total destructive interference of the first and second sub-signals for a predetermined wavelength when they are combined into the output signal.

While in the present exemplary embodiment, the first and second sub-signals are described as passing through the first and second compensator plates prior to passing through the first and second plates, the scope of the present invention is not limited to such an arrangement. As will be apparent to those of skill in the art, the method of the present invention has application to interferometers in which the first and second signals are passed through plates and compensator plates in any order.

Figure 5:
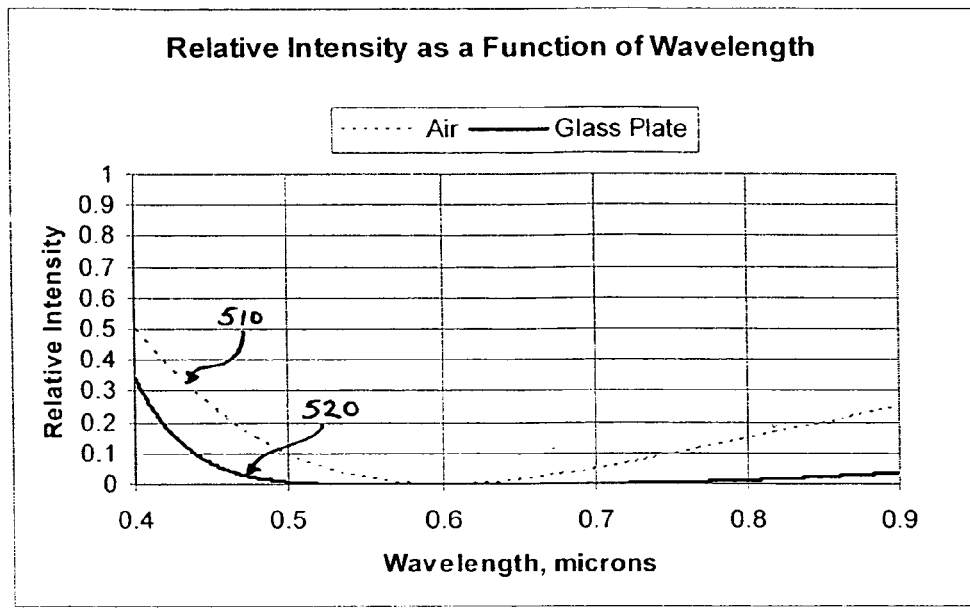
FIG. 5 is a graph illustrating an advantage in wavelength blockage of an interferometer according to one embodiment of the present invention.

Turning to FIG. 5, the relative intensity of an output signal over a range of wavelengths is compared for a conventional Michelson interferometer and an interferometer according to one embodiment of the present invention. In this exemplary embodiment, the first and second plates are composed of silica, with a thickness t of 4.0 mm. The refractive index n was calculated as a function of wavelength using optical modeling software. The predetermined wavelength $\lambda_0$ was selected to be 0.6 microns. A value of $-0.5 \times \lambda_0$ was selected for the desired OPD. Accordingly, using Equations 10 and 12, above, a value of 5.11776° was selected for θ, and a value of −5.1702 microns was selected for p. The intensity of the output signal is calculated according to Equation 13:

$$I = \frac{(1 + \cos(2\pi\ OPD_\lambda))^2 + \sin^2(2\pi\ OPD_\lambda)}{4}. \quad [13]$$

As can be seen with reference to plots 510 and 520, the range of wavelengths around the predetermined wavelength with a lower relative intensity is much broader for the interferometer of the present invention (520) than for a conventional Michelson interferometer (510).

Figure 6:
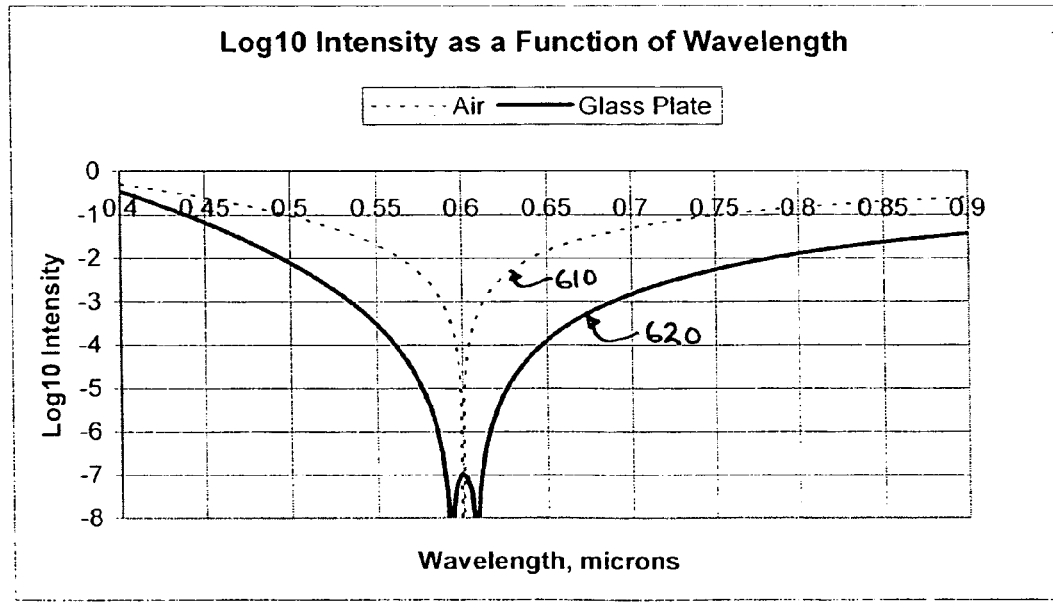
FIG. 6 is a graph illustrating an advantage in wavelength blockage of an interferometer according to one embodiment of the present invention.
Figure 7:
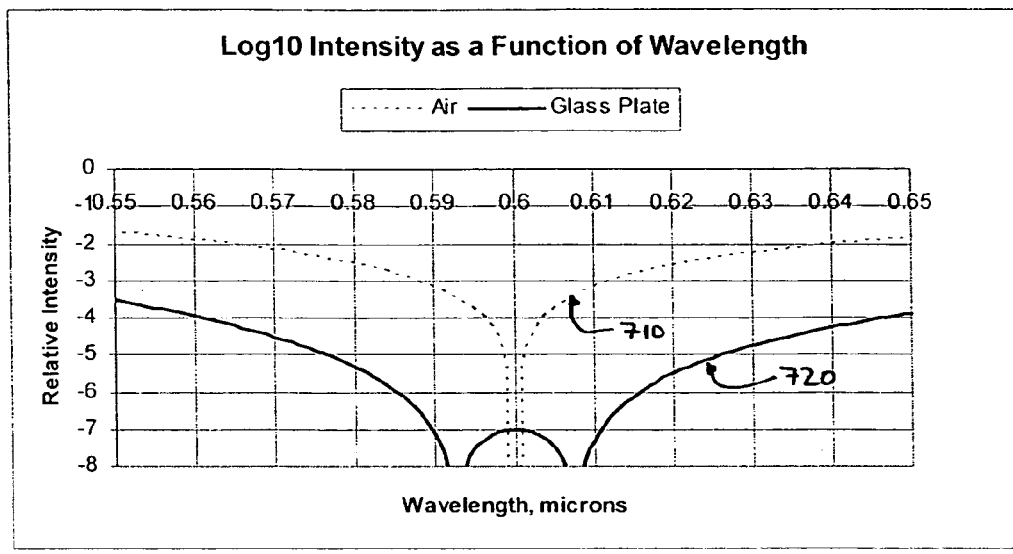
FIG. 7 is a graph illustrating an advantage in wavelength blockage of an interferometer according to one embodiment of the present invention.

The improvement is illustrated even more dramatically in FIG. 6, in which is charted the $\log_{10}$ of the intensity of the output signals illustrated in FIG. 5. As can be seen with reference to plots 610 and 620, an attenuation of more than six decades is present over a considerably broader range of wavelengths for the interferometer of the present invention (620) than for a conventional Michelson interferometer (610). FIG. 7 provides a closer view of the chart of FIG. 6, illustrating in greater detail the spectral region about the predetermined wavelength (i.e., 0.6 microns). While for the interferometer of the present invention (720), the interference is not totally destructive at the predetermined wavelength, an attenuation of about seven decades is nevertheless observed. As a result of the combined effects of the beam dispersion and the optical path differences introduced by the pistoning of the moveable mirror and the inclination of one of the silica plates, two intensity minima are observed about the predetermined wavelength for the interferometer of the present invention (720), as opposed to the single minima at the predetermined wavelength seen in the plot for the conventional Michelson interferometer (710).

Figure 8:
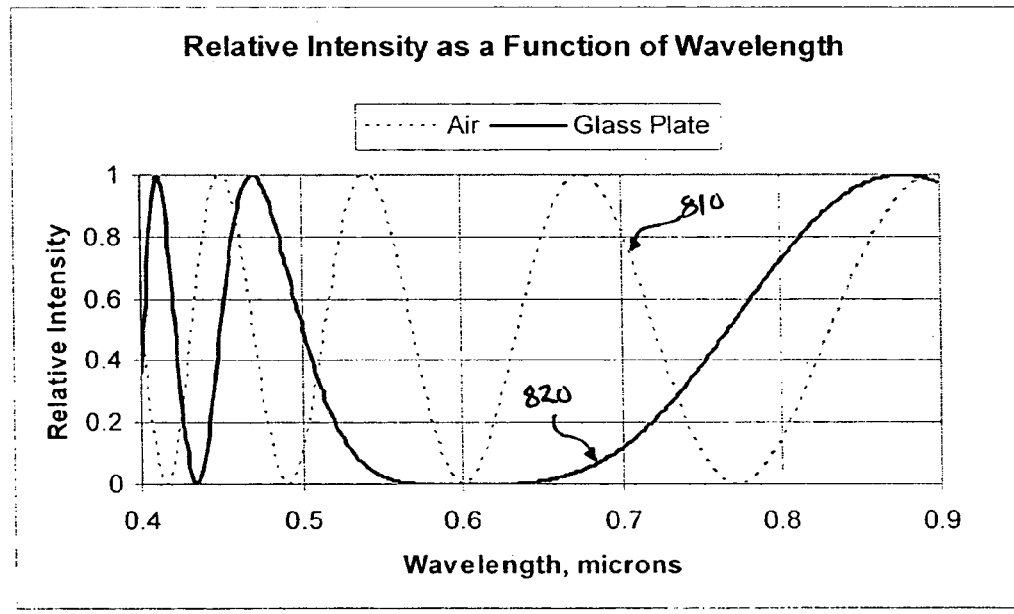
FIG. 8 is a graph illustrating an advantage in wavelength blockage of an interferometer according to another embodiment of the present invention.

Turning to FIG. 8, the effect of selecting a higher odd integer multiple of one half of the predetermined wavelength for the OPD used in Equation 12 is observed. In this exemplary embodiment, the OPD was selected to be $-\frac{9}{2} \times \lambda_0$. The predetermined wavelength $\lambda_0$ was again selected to be 0.6 microns. A value of $-4.5 \times \lambda_0$ was selected for the desired OPD. Accordingly, using Equations 10 and 12, above, a value of 15.3448° was selected for θ, and a value of −47.0833 microns was selected for p. As can be seen with reference to plots 810 and 820, the range of wavelengths around the predetermined wavelength with a lower relative intensity is narrower than in FIG. 5, above, although it is still much broader for the interferometer of the present invention (820) than for a conventional Michelson interferometer (810).

Figure 9:
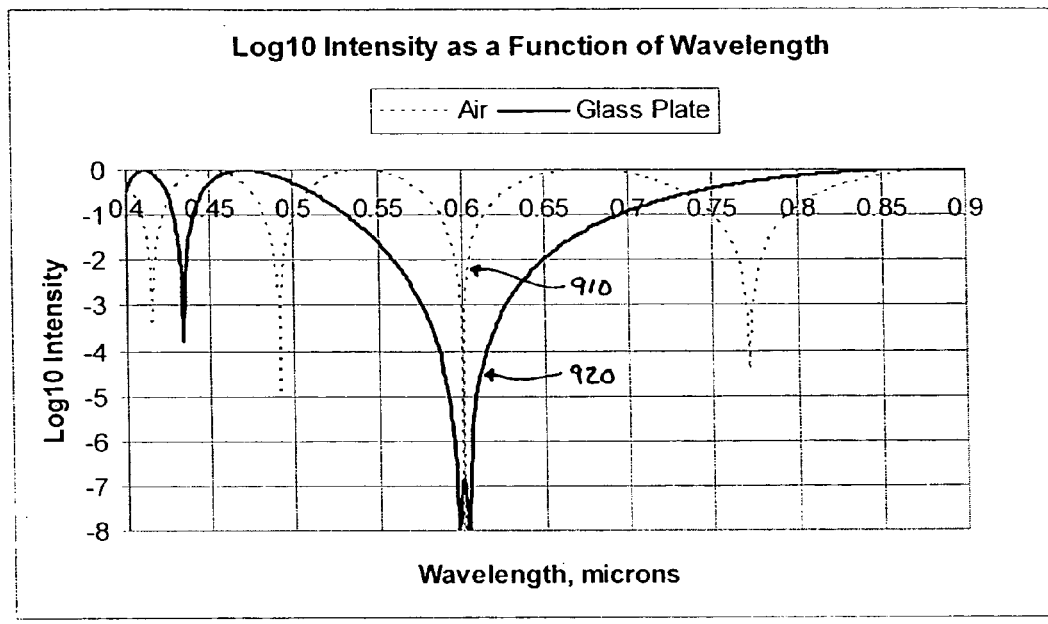
FIG. 9 is a graph illustrating an advantage in wavelength blockage of an interferometer according to another embodiment of the present invention.
Figure 10:
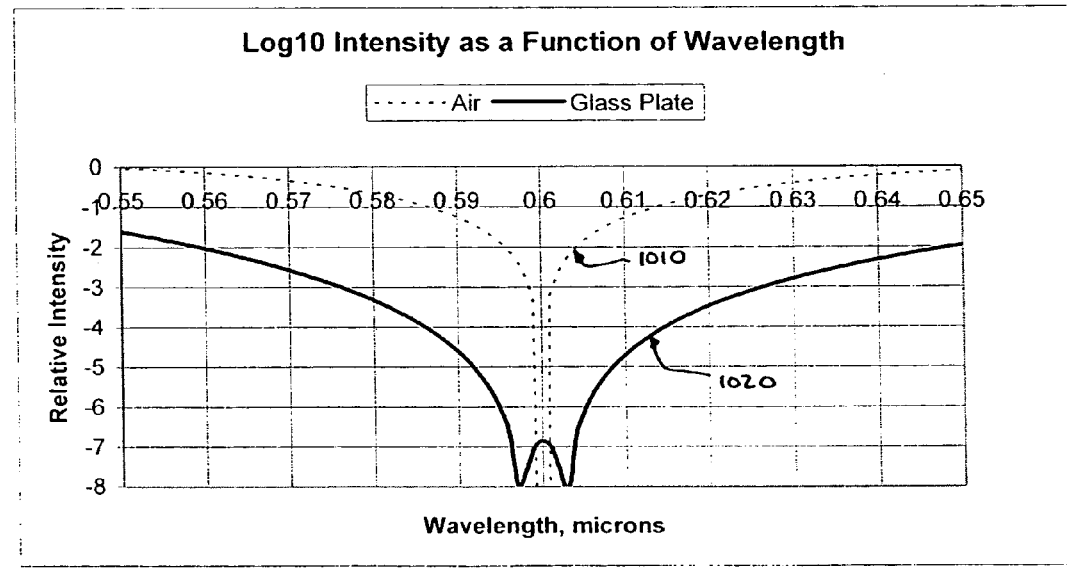
FIG. 10 is a graph illustrating an advantage in wavelength blockage of an interferometer according to another embodiment of the present invention.

The improvement is illustrated even more dramatically in FIG. 9, in which is charted the $\log_{10}$ of the intensity of the output signals illustrated in FIG. 8. As can be seen with reference to plots 910 and 920, an attenuation of more than six decades is present over a considerably broader range of wavelengths for the interferometer of the present invention (920) than for a conventional Michelson interferometer (910). FIG. 10 provides a closer view of the chart of FIG. 9, illustrating in greater detail the spectral region about the predetermined wavelength (i.e., 0.6 microns). While for the interferometer of the present invention (1020), the interference is not totally destructive at the predetermined wavelength, an attenuation of about seven decades is nevertheless observed. As a result of the combined effects of the beam dispersion and the optical path differences introduced by the pistoning of the moveable mirror and the inclination of one of the silica plates, two intensity minima are observed about the predetermined wavelength for the interferometer of the present invention (1020), as opposed to the single minima at the predetermined wavelength seen in the plot for the conventional Michelson interferometer (1010).

While the present invention has been particularly described with first to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. An interferometer with wavelength blockage based on a predetermined wavelength, the interferometer comprising:
   a beamsplitter that splits an incoming signal into a first sub-signal and a second sub-signal;
   a first plate through which the first sub-signal passes, the first plate having a refractive index n and a thickness t, and being disposed perpendicular to a direction in which the first sub-signal travels;
   a first mirror that receives the first sub-signal from the first plate and directs the first sub-signal back through the first plate to the beamsplitter;
   a second plate through which the second sub-signal passes, the second plate having a refractive index n and a thickness t, and being disposed at an angle $\theta$ to a direction in which the second sub-signal travels; and
   a second mirror that receives the second sub-signal from the second plate and that directs the second sub-signal back through the second plate to the beamsplitter where the first sub-signal and the second sub-signal are combined to form an output signal, the output signal having a range of wavelengths with attenuated amplitudes;
   wherein one of the first mirror and the second mirror is a moveable mirror that adjusts an optical path length of a respective one of the first sub-signal and the second sub-signal to introduce an optical path difference ("OPD") between the optical path lengths of the first sub-signal and the second sub-signal.

2. The interferometer of claim 1, further comprising:
   a first compensator plate through which the first sub-signal passes, the first compensator plate being disposed between the beamsplitter and the first mirror, and having a refractive index n and a thickness ½t, and being disposed at an angle $\theta$ to the direction in which the first sub-signal travels; and
   a second compensator plate through which the second sub-signal passes, the second compensator plate being disposed between the beamsplitter and the second mirror, and having a refractive index n and a thickness ½t, and being disposed perpendicular to the direction in which the second sub-signal travels.

3. The interferometer of claim 2, wherein the first compensator plate and the second compensator plate are substantially transparent at the predetermined wavelength.

4. The interferometer of claim 1, wherein the first plate and the second plate are substantially transparent at the predetermined wavelength.

5. The interferometer of claim 1, wherein the optical path difference ("OPD") is an odd integer multiple of half of the predetermined wavelength.

6. The interferometer of claim 1, wherein the range of wavelengths with attenuated amplitudes includes the predetermined wavelength.

7. The interferometer of claim 1, wherein the range of wavelengths with attenuated amplitudes includes two wavelengths having intensity minima.

8. The interferometer of claim 1, wherein the angle $\theta$ is determined according to the equation:

$$\sin\theta = n_0 \sqrt{1 - \frac{1}{\left(\frac{OPD}{2t\frac{dn}{d\lambda}\big|_{\lambda=\lambda_0}} + 1\right)^2}}$$

where $\lambda_0$ is the predetermined wavelength, $n_0$ is a refractive index of the second plate at the predetermined wavelength $\lambda_0$, and $$\frac{dn}{d\lambda}\bigg|_{\lambda=\lambda_0}$$

is a differential of the refractive index n with respect to a wavelength $\lambda$ of the second sub-signal at the predetermined wavelength $\lambda_0$.

9. The interferometer of claim 8, wherein $$\left(\frac{OPD}{2t\frac{dn}{d\lambda}\big|_{\lambda=\lambda_0}} + 1\right)^2 \geq 1.$$

10. An interferometer with wavelength blockage based on a predetermined wavelength, the interferometer comprising:
    a beamsplitter that splits an incoming signal into a first sub-signal and a second sub-signal;
    a first plate through which the first sub-signal passes, the first plate having a refractive index n and a thickness t, being substantially transparent at the predetermined wavelength, and being disposed perpendicular to a direction in which the first sub-signal travels;
    a first mirror that receives the first sub-signal from the first plate and directs the first sub-signal back through the first plate to the beamsplitter;
    a second plate through which the second sub-signal passes, the second plate having a refractive index n and a thickness t, being substantially transparent at the predetermined wavelength, and being disposed at an angle $\theta$ to a direction in which the second sub-signal travels;
    a second mirror that receives the second sub-signal from the second plate and that directs the second sub-signal back through the second plate to the beamsplitter where the first sub-signal and the second sub-signal are combined to form an output signal, the output signal having a range of wavelengths with attenuated amplitudes;
    a first compensator plate through which the first sub-signal passes, the first compensator plate being disposed between the beamsplitter and the first mirror, being substantially transparent at the predetermined wavelength, having a refractive index n and a thickness ½t, and being disposed at an angle $\theta$ to the direction in which the first sub-signal travels; and
    a second compensator plate through which the second sub-signal passes, the second compensator plate being disposed between the beamsplitter and the second mirror, being substantially transparent at the predetermined wavelength, having a refractive index n and a thickness ½t, and being disposed perpendicular to the direction in which the second sub-signal travels;
    wherein one of the first mirror and the second mirror is a moveable mirror that adjusts an optical path length of a respective one of the first sub-signal and the second sub-signal to introduce an optical path difference ("OPD") between the optical path lengths of the first sub-signal and the second sub-signal.

11. The interferometer of claim 10, wherein the optical path difference ("OPD") is an odd integer multiple of half of the predetermined wavelength.

12. The interferometer of claim 10, wherein the range of wavelengths with attenuated amplitudes includes the predetermined wavelength.

13. The interferometer of claim 10, wherein the range of wavelengths with attenuated amplitudes includes two wavelengths having intensity minima.

14. The interferometer of claim 10, wherein the angle $\theta$ is determined according to the equation:

$$\sin\theta = n_0 \sqrt{1 - \frac{1}{\left(\frac{OPD}{2t\frac{dn}{d\lambda}\big|_{\lambda=\lambda_0}} + 1\right)^2}}$$

where $\lambda_0$ is the predetermined wavelength, $n_0$ is a refractive index of the second plate at the predetermined wavelength $\lambda_0$, and $$\frac{dn}{d\lambda}\bigg|_{\lambda=\lambda_0}$$

is a differential of the refractive index n with respect to a wavelength $\lambda$ of the second sub-signal at the predetermined wavelength $\lambda_0$.

15. The interferometer of claim 14, wherein $$\left(\frac{OPD}{2t\frac{dn}{d\lambda}\big|_{\lambda=\lambda_0}} + 1\right)^2 \geq 1.$$

16. A method for nulling a broad range of wavelengths using an interferometer, the method comprising the steps of:
   splitting an incoming signal into a first sub-signal and a second sub-signal using a beamsplitter;
   passing the first sub-signal through a first plate having a refractive index n and a thickness t, the first plate being disposed perpendicular to a direction in which the first sub-signal travels;
   receiving the first sub-signal from the first plate with a first mirror that directs the first sub-signal back through the first plate to the beamsplitter;
   passing the second sub-signal through a second plate having a refractive index n and a thickness t, the second plate being disposed at an angle $\theta$ to a direction in which the second sub-signal travels;
   receiving the second sub-signal from the second plate with a second mirror that directs the second sub-signal back through the second plate to the beamsplitter; and
   combining the first sub-signal and the second sub-signal with the beamsplitter to form an output signal having a range of wavelengths with attenuated amplitudes;
   wherein one of the first mirror and the second mirror is a moveable mirror that adjusts an optical path length of a respective one of the first sub-signal and the second sub-signal to introduce an optical path difference ("OPD") between the optical path lengths of the first sub-signal and the second sub-signal.

17. The method of claim 16, further comprising the steps of:
   passing the first sub-signal through a first compensator plate disposed between the beamsplitter and the first mirror, the first compensator plate having a refractive index n and a thickness ½t, and being disposed at an angle $\theta$ to the direction in which the first sub-signal travels; and
   passing the second sub-signal through a second compensator plate disposed between the beamsplitter and the second mirror, the second compensator plate having a refractive index n and a thickness ½t, and being disposed perpendicular to the direction in which the second sub-signal travels.

18. The method of claim 16, wherein the first plate and the second plate are substantially transparent at the predetermined wavelength.

19. The method of claim 17, wherein the first compensator plate and the second compensator plate are substantially transparent at the predetermined wavelength.

20. The method of claim 16, wherein the optical path difference ("OPD") is an odd integer multiple of half of the predetermined wavelength.

21. The method of claim 16, wherein the range of wavelengths with attenuated amplitudes includes the predetermined wavelength.

22. The method of claim 16, wherein the range of wavelengths with attenuated amplitudes includes two wavelengths having intensity minima.

23. The method of claim 16, wherein the angle $\theta$ is determined according to the equation:

$$\sin\theta = n_0 \sqrt{1 - \frac{1}{\left(\frac{OPD}{2t\frac{dn}{d\lambda}\big|_{\lambda=\lambda_0}} + 1\right)^2}}$$

where $\lambda_0$ is the predetermined wavelength, $n_0$ is a refractive index of the second plate at the predetermined wavelength $\lambda_0$, and $$\frac{dn}{d\lambda}\bigg|_{\lambda=\lambda_0}$$

is a differential of the refractive index n with respect to a wavelength $\lambda$ of the second sub-signal at the predetermined wavelength $\lambda_0$.

24. The method of claim 23, wherein $$\left(\frac{OPD}{2t\frac{dn}{d\lambda}\big|_{\lambda=\lambda_0}} + 1\right)^2 \geq 1.$$

* * * * *